Figure 1:
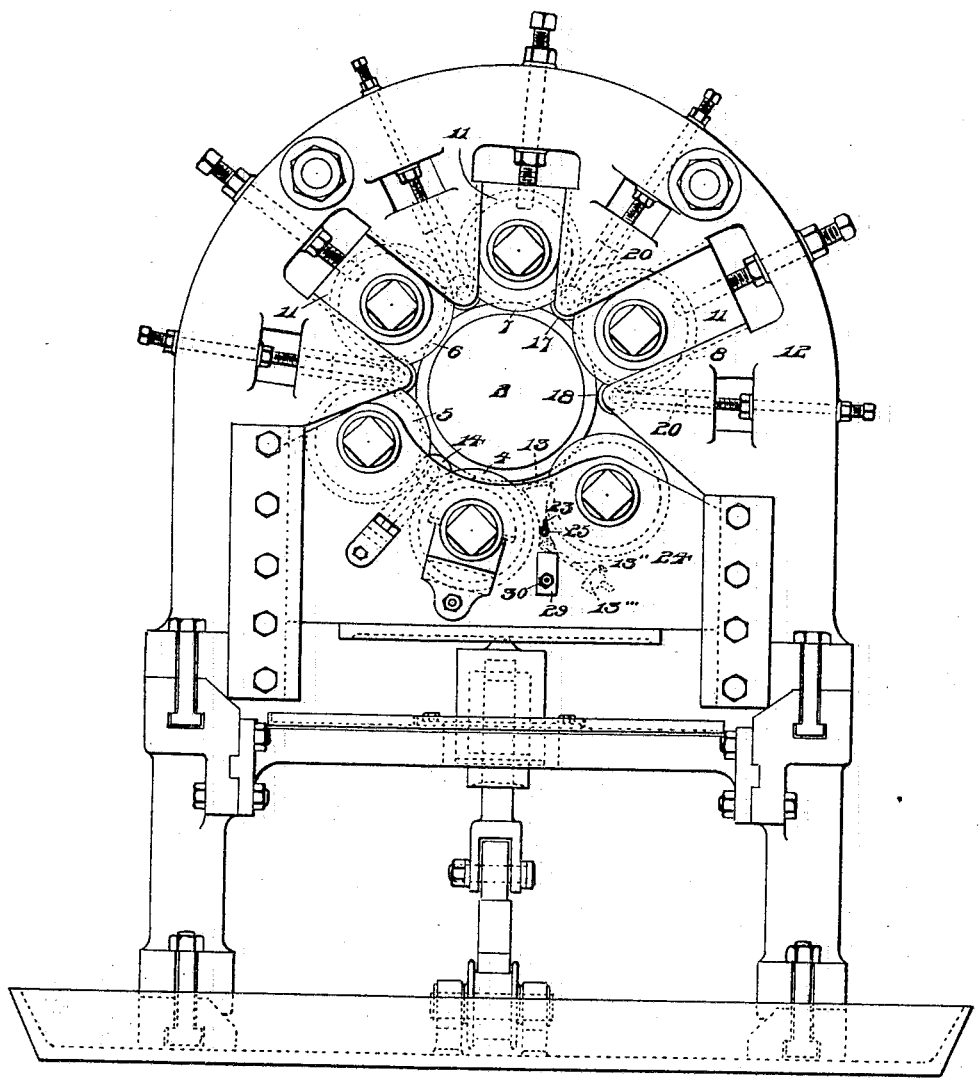

No. 766,363. PATENTED AUG. 2, 1904.
G. W. LA VOO.
APPARATUS FOR WELDING RINGS.
APPLICATION FILED SEPT. 24, 1903.
NO MODEL. 2 SHEETS—SHEET 1.

WITNESSES:

INVENTOR
George W. La Voo,
By Wm. L. Pierce
Attorney

No. 766,363. PATENTED AUG. 2, 1904.
G. W. LA VOO.
APPARATUS FOR WELDING RINGS.
APPLICATION FILED SEPT. 24, 1903.
NO MODEL.
2 SHEETS—SHEET 2.
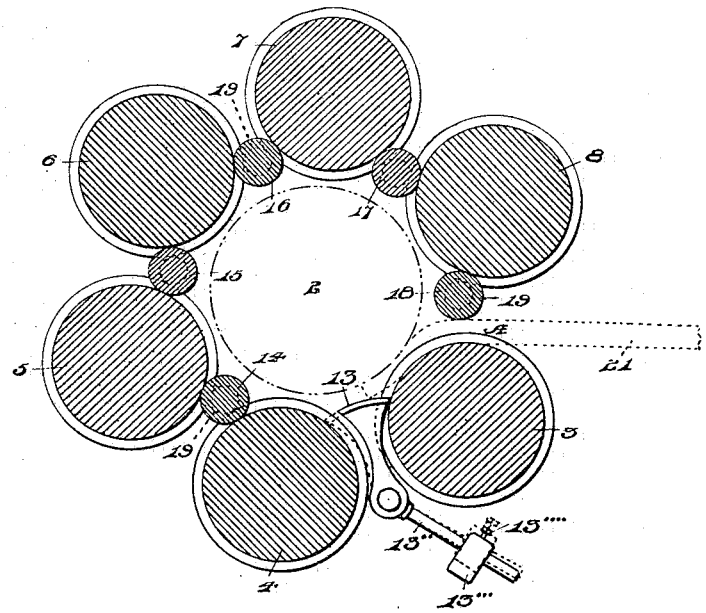
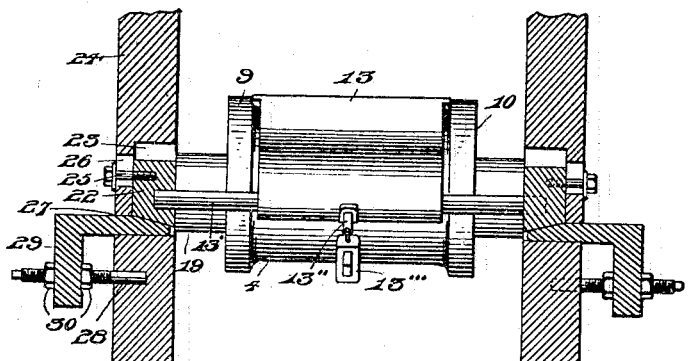
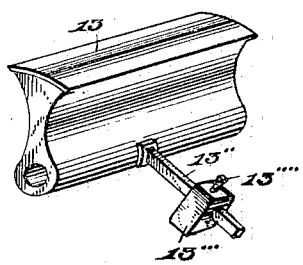
WITNESSES:
INVENTOR
George W. La Voo,
By Wm L. Pierce,
Attorney No. 766,363.	Patented August 2, 1904.

UNITED STATES PATENT OFFICE.

GEORGE W. LA VOO, OF STEUBENVILLE, OHIO, ASSIGNOR OF ONE-HALF TO LA BELLE IRON WORKS, OF STEUBENVILLE, OHIO, A CORPORATION OF WEST VIRGINIA.

APPARATUS FOR WELDING RINGS.

SPECIFICATION forming part of Letters Patent No. 766,363, dated August 2, 1904.

Application filed September 24, 1903. Serial No. 174,528. (No model.)

*To all whom it may concern:*

Be it known that I, GEORGE W. LA VOO, a citizen of the United States, residing at Steubenville, in the county of Jefferson and State of Ohio, have invented or discovered new and useful Improvements in Apparatus for Welding Rings, of which the following is a specification.

My invention relates to the welding of metal rings—such as pipe-couplings, thread-protectors, &c.—by means of cluster-rolls surrounding a mandrel; and its objects are to prevent the front end of the heated blank from upsetting and from passing out between the shaping-rolls, which would result in welding the blank around one of such rolls; to cause the blank to clasp the mandrel tightly and make rings of uniform size, and, further, to prevent the metal from looping out between the shaping-rolls.

To that end my invention consists in providing a conveying-guide between the first two of the cluster and similar or other guides between the other shaping-rolls of the cluster, which are preferably in the form of rotary rolls arranged to hold the blank in proper position and prevent improper action.

Figure 1 is an end elevation of a rolling-mill constructed in accordance with my invention. Fig. 2 is a central vertical section of the rolls with the housings removed. Fig. 3 is an inner face view of one-half of the rolls in position with the mandrel removed, the housings being broken away; and Fig. 4 is a perspective view of the conveying-guide which I employ.

In the drawings, 2 indicates the usual mandrel, around which the ring is formed, and 3, 4, 5, 6, 7, and 8 represent the shaping-rolls having the usual curved pass or groove formed between end collars 9 and 10. These rolls may be supported in adjustable bearings 11, which slide within radial guideways in the housings 12. The roll 3, called the "feed-roll," and the opposite roll 5 I have shown in fixed bearing, as it is not found necessary to adjust these rolls.

Around the mandrel and between the adjacent shaping-rolls, except between the rolls 3 and 4, I provide rotary guides consisting of small rollers 14, 15, 16, 17, and 18, these rollers being preferably shaped to fit between the pair of shaping-rolls. These guiding-rollers are preferably provided with shafts or necks 19, which, except rollers 3 and 5, are mounted in adjustable bearings 20, by which the rollers may be moved toward and from the mandrel. The roller 14 need not be adjusted, and I have shown it in a fixed bearing. The guiding-rollers may be rotated merely by frictional contact with the metal being rolled. It will be understood that where rotary guides are used they may be driven in many different ways. For example, they may be provided with gear-wheels intermeshing with gears on the roll-necks or they may be driven by external connections.

Between the first two shaping-rolls 3 and 4 I do not employ a guide-roller, but use what I call a "conveying-guide" 14, whose surface nearest the mandrel 2 is preferably the arc of a circle whose radius is much greater than that of the rolls 14 15, &c. The guide 13 has its middle portion extending down between the rolls 3 and 4 and is supported pivotally by the pin or shaft 13' extending through its lower portion. The guide 13 is provided with an arm 13", extending out below the roll 3 and provided with an adjustable weight 13''', secured to the arm by the set-screw 14''''. The part of the guide between the rolls 3 and 4 is hollowed out so that the top of the guide may lie closely against the roll 3 or 4 when in its extreme position.

By reason of the guide 13 having a longer radius than the rolls 14 15, &c., which have about the maximum radius a roll could have between the rolls 3 and 4, the forward side of the guide 13, which is the side first engaged by the blank 21, will lie much higher than would the forward side of a roll like 14. The result is that the blank strikes the guide 13 at a very blunt angle instead of a very acute one, practically a right angle in the case a roll-guide were used. The blank 21 readily tilts the guide 13 back to the left on Fig. 2, thus giving the advanced end of the blank a slight start, but one sufficient to carry the same successfully between the mandrel 2 and the roll 4 without upsetting or in any way injuring it. The weight 13''' causes the guide 13 to normally contact closely with the roll 3, so that the blank cannot start down between the guide and the roll. If desired, guides like 13 may be used for the roller-guides 14 to 18.

The pin or shaft 13' has its ends supported in blocks 22, slidable up and down in the slots 23 in the plates 24, in which the rolls 3, 4, and 5 are journaled. These blocks are held to the sides of the slots by means of the heads of the bolts 25, passed through the slots 26 in the plates 24. Wedges 27 are passed from the outside of the plates 24 through slots into engagement with the bottoms of the blocks 22.

In the plates 24 are fixed bolts 28, having threaded ends passing through the downturned ends 29 of the wedges. By means of nuts 30, which are screwed on the bolts against opposite sides of the ends 29, the wedges may be adjusted back and forth to suit the pass and securely held in place.

It is clear that my guide 13 has a wider use than with a ring-forming machine, since it may be used where only three rolls are used, one on one side of the pass and two on the other.

In operating the mill the shaping-rollers 3 to 8 are driven by connections in the usual manner, and as the heated blank 21 enters at the point marked A, Fig. 2, between the roll 3 and the rotary guide 18, its end is bent down and started upon the mandrel 2. This end then contacts with the pivoted conveying-guide 13, which turns on its pivot and carries this end forward against the mandrel, as above described, and as it passes each successive shaping-roller the successive rotary or other guides hold it closely in contact with the mandrel and prevent its looping out between the shaping-rolls. During this action the collars of the shaping-rolls work upon the hot metal and shape and hold it in place. After the removal of each ring the guide will move back to its normal position against the leading roll 3.

It is found in practice that the guide 13 and the small guiding-rollers 14 to 18 effectually prevent the entering end from passing out between the shaping-rolls, and hence prevent welding a ring around one of these shaping-rolls. They also force the blank tightly on the mandrel, thus making couplings of uniform diameter, whereas without their use the coupling is liable to run loose on the mandrel, giving a variation in the size. They also prevent the looping out between the shaping-rollers, which has heretofore caused the coupling to be formed in an irregular circle.

The guides 14 to 18 may rotate or not, as desired, and many variations may be made in their form and arrangement when used, in their number, and the means for driving them without departing from my invention.

Having described my invention, I claim—

1. In a rolling-mill, a mandrel, a plurality of shaping-rolls arranged to form a pass between the mandrel and the shaping-rolls, and a guide movable back and forth across the space between two of the shaping-rolls.

2. In a rolling-mill, a mandrel, a plurality of shaping-rolls arranged to form a pass between the mandrel and the shaping-rolls, a guide movable back and forth across the space between two of the shaping-rolls, and means for adjusting the guide toward and from the mandrel.

Signed at Steubenville, Ohio, this 18th day of September, 1903.

GEORGE W. LA VOO.

Witnesses:
JOHN BAXTER,
J. E. WRIGHT.